United States Patent [19]

Raske

[11] 3,908,886
[45] Sept. 30, 1975

[54] APPARATUS FOR ULTRASONIC WELDING
[75] Inventor: Hans Raske, Munich, Germany
[73] Assignee: Siemens Aktiengesellschaft, Berlin & Munich, Germany
[22] Filed: Feb. 27, 1974
[21] Appl. No.: 446,161

[30] Foreign Application Priority Data
Mar. 14, 1973 Germany............................ 2312724

[52] U.S. Cl. ................. 228/1; 29/25.35; 29/470.1; 29/473.1; 29/498; 228/9
[51] Int. Cl.² .......................................... B23K 1/06
[58] Field of Search ........... 228/1, 9; 29/473.1, 498, 29/25.35, 470.1; 156/73, 583

[56] References Cited
UNITED STATES PATENTS
3,370,151   2/1968   Normando ............................ 228/9
3,700,532   10/1972  Pierson ................................. 228/1
3,813,021   5/1974   Kramer .................................. 228/1
3,822,465   7/1974   Frankort et al. ...................... 228/1

Primary Examiner—Carl E. Hall
Attorney, Agent, or Firm—Hill, Gross, Simpson, Van Santen, Steadman, Chiara & Simpson

[57] ABSTRACT

Apparatus for welding a metallic component to a non-metallic component which involves interposing an aluminum layer between metallic and non-metallic components, preheating the metallic component and the aluminum layer, preferably by induction heating, to a temperature of at least 250°C and then subjecting the components to ultrasonic welding.

6 Claims, 5 Drawing Figures

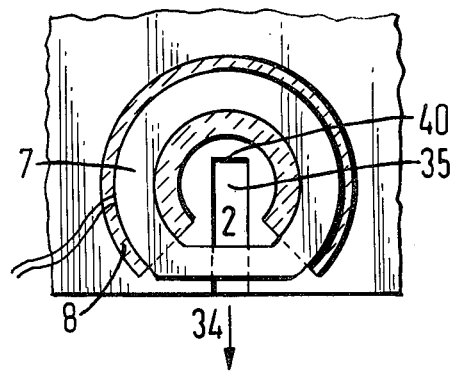
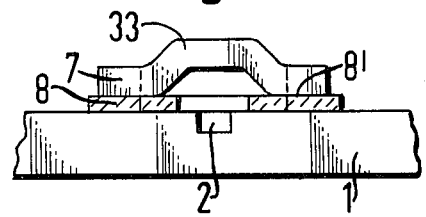
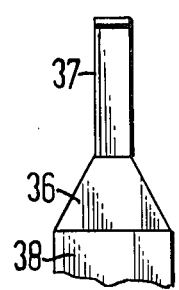
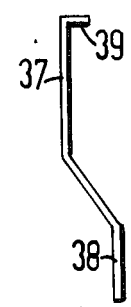

APPARATUS FOR ULTRASONIC WELDING

BACKGROUND OF THE INVENTION

1. Field of the Invention

This invention is in the field of welding together a metallic component to a non-metallic component through the use of a metallic aluminum film and preheating of the metallic components by induction heating prior to the ultrasonic welding operation.

2. Description of the Prior Art

An electromechanically operating oscillator such as employed as channel filters in the telephone art consists of a piezoceramic plate metallically connectd to a steel oscillator rod. The oscillator rod has a semicircular cross-sectional configuration. The face which serves to electrically connect the plate and which is remote from the connection surface to the oscillator rod bears a gold layer which must be protected from damage. The metallic connection of the plate to the steel component is carried out by applying a noble metal layer to the connection surface of the ceramic plate. Subsequently, the components which are to be connected are soldered by means of a tin foil as an intermediate layer. The tinfoil is placed on the noble metal coated surface of the plate and is covered by the pre-treated surface of the steel component. Soldering is then completed by inductively melting the tinfoil. Solder connections of this type are, however, not very resistant to continuous mechanical stresses such as are caused by the steel rod when it is excited to bending oscillations by the plate. The life duration of the oscillator is therefore limited.

To avoid this disadvantage, it has been proposed in an earlier German application that instead of tinfoil, an aluminum foil or layer be interposed between the piezoceramic plate which has the noble metal layer and the steel oscillator rod, and that these components be then ultrasonically welded. The application of the aluminum layer to the plate is carried out either by vapor deposition or by spraying, such as in a plasma arc. Alternatively, an aluminum foil is interposed between the components to be joined by welding. The aluminum layer has a minimum thickness of about 20 microns. The welding is carried out by fixing the plate in a workpiece holder of an ultrasonic welding device. Where a loose aluminum foil is used, the latter is placed onto the connection surface of the plate to which the steel component is in turn applied. With a pressure force of at least 2 Newtons per square millimeter, depending on the size of the connection surfaces of the components, the sonotrode of an ultrasonic welding device is then placed on the steel components. The welding of the components then proceeds in the usual manner. The ultrasonic or welding power required for this purpose amounts to approximately 15 watts per square millimeter, depending on the size of the connection surface. This ceramic-noble metal-aluminum-steel connection is highly resistant to stresses occurring in a bending oscillator of this type.

Depending upon the nature of the material and the dimensions of the non-metallic component, it is possible that the non-metallic component will not be sufficiently resistant to the loads occurring during ultrasonic welding. Hairline cracks or even breakage of the sensitive component are possible. If damage of this type occurs, the entire welded component must be discarded. If, however, the sonic energy required for the homogeneous welding of the components is reduced, the temperature of approximately 660°C necessary for the fusion of the highly pure aluminum layer is not reached. Fault centers may be formed within the weld connection and these will lead to the destruction of the weld connection during the subsequent operation of the component.

SUMMARY OF THE INVENTION

The object of the present invention is to provide a process and apparatus for the ultrasonic welding of a metal component to a non-metal component provided with a noble metal layer, for example, a piezoceramic plate or a quartz or glass plate, utilizing an interposed layer of metal but eliminating the above-mentioned disadvantages. In the preferred form of the invention, an aluminum layer or foil is applied to the connection surfaces of the metal component and the non-metallic component, the non-metallic component is fixedly held and the connection surfaces, coated with aluminum, are placed upon one another where they are preheated to a temperature of at least 250°C, and preferably 350°C. In the final step, these preheated parts are connected to one another by ultrasonic welding. Particularly advantageous results are obtained if the metal components are preheated in a high frequency, electromagnetic field.

As a result of this separate heating, particularly of the aluminum layer, not only is a homogeneous, entire area weld connection achieved, but it is also possible to reduce considerably the sonic energy which must be used in the ultrasonic welding of the components and which often leads to the destruction of the non-metallic components. When a high frequency electromagnetic field is used to inductively heat the aluminum layer, it is preferably only the latter and the metallic component which are heated. As mentioned, the aluminum foil is heated preferably to a temperature of about 350°C by means of the high frequency electromagnetic field. Then the sonotrode or the sonotrode insert of the ultrasonic welding device is lowered onto the metal component and the welding process is carried out. During the ultrasonic welding process, the metal component is set into an ultrasonic oscillation which is parallel to the connection surface with a pressure of approximately 2 Newtons per square millimeter, depending on the size of the connection surface of the components to be welded. The preheated aluminum foil thus rapidly heats to its plasticizing temperature so that the components are welded to one another.

One of the features of the present invention resides in monitoring the preheating of the metallic component in aluminum foil in the high frequency, electromagnetic field by means of a photoelectric monitor. When a temperature of about 350°C is reached, the sonotrode or the operative insert of the sonotrode is lowered onto the metal component to be welded and the ultrasonic welding device is at the same time energized and the parts to be connected are welded. For a semiautomatic or fully automatic welding operation it is advantageous to precisely set the duration of the ultrasonic welding process so that at the end of the preset and predetermined welding time, the process is completed.

The welding apparatus of the present invention may include an ultrasonic welding device having a sonotrode in which there is applied an insert introduced at right angles to the oscillation direction of the sonotrode, the insert having an operative surface which transmits ultrasonic oscillations to the metal component in such a manner that these oscillations run parallel to the connection surface of the components being welded. The workpiece holder holds the non-metallic component to be welded during the welding process. The workpiece holder is, in the preferred form of the invention, surrounded by a coil or loop which produces a high frequency, electromagnetic field. This coil or loop rests on a base composed of a ceramic material. It is held at a distance from the workpiece holder, also referred to as an anvil, which generally consists of metal, by means of the ceramic base. The operative surface of the sonotrode insert is preferably contoured to the shape of the metal component to be welded in such a manner that it engages the component at right angles to the oscillation direction. The workpiece holder or plate may be in the form of a plate and has a slot into which the ceramic component is inserted. This slot is arranged in such a manner that its two parallel sides run at right angles to the direction of oscillation of the sonotrode. This arrangement insures that the non-metallic workpiece which is positioned in the slot remains stationary during the ultrasonic welding process.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 2 is a plan view of the workpiece holder showing the high frequency coil therearound;

FIG. 3 is an elevational view of the structure shown in FIG. 2;

FIG. 4 is a fragmentary plan view of a tool which can be used to locate the non-metallic component in the welding assembly; and FIG. 5 is a side elevational view of the device of FIG. 4.

DESCRIPTION OF THE PREFERRED EMBODIMENTS

Figure 1:
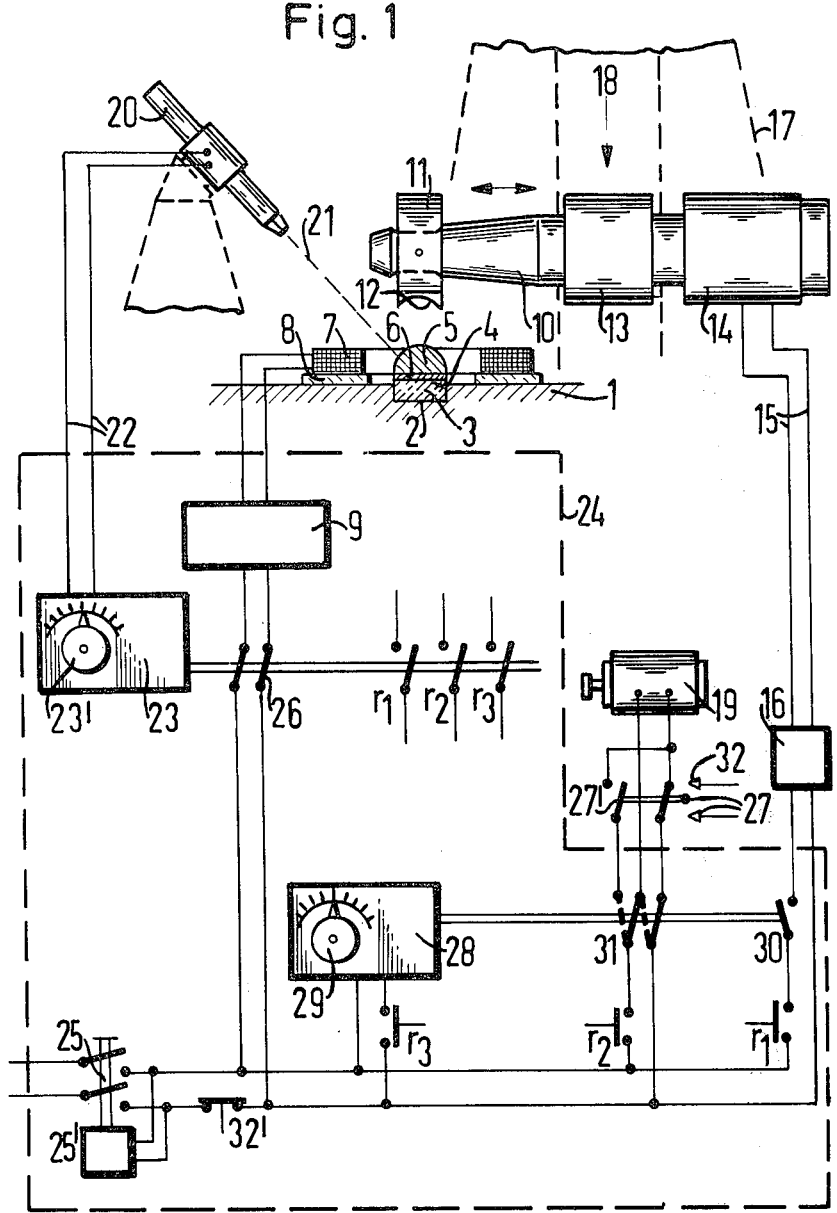
FIG. 1 is a somewhat schematic view of an ultrasonic welding assembly according to the present invention.

The workpiece holder or anvil 1 has a slot 2 formed therein which serves to accommodate the non-metallic component, in this case, a piezoceramic plate 3. This plate is coated on its bearing or contact surface and on its connection surface 4 with a layer of noble metal. To this plate there is to be welded a metallic component 5 such, for example, as an oscillator rod composed of steel. The connecting medium is an aluminum foil or layer 6 which is positioned between the plate 3 and the metal component 5. A coil or loop 7 surrounds the components which are to be welded in as close proximity as possible. A base 8 composed of a ceramic material such as steatite holds the loop 7 at a distance from the anvil 1. The loop 7 is electrically connected to a high frequency generator 9. Above the metal component 5 there is positioned an ultrasonic welding tool which in the illustrated instance includes a sonotrode 10 having a sonotrode insert 11. The operative surface 12 of the sonotrode insert is contoured to match the surface contour of the metal component 5. The sonotrode is held in a bearing 13 and on the side facing away from the insert 11, the sonotrode bears an ultrasonic emitter 14 which is connected by means of lines 15 to an ultrasonic generator 16. The bearing 13 of the sonotrode is arranged to be guided in a sonotrode guide 17, shown in broken lines in FIG. 1 in the direction of the arrow 18 and also in the reverse direction. The mechanical guidance of the sonotrode is accomplished by means of a servo motor 19. A photoelectric-type temperature measuring device 20 having an optical axis 21 directed toward the metal component 5 is connected by means of lines 22 to a temperature switch 23 whose switching temperature may be adjusted by means of a knob 23'. The temperature switch 23 forms part of a sequence control unit which is enclosed within a dashed line 24.

Power is received into the unit through a double pole switch 25 and is automatically kept applied by means of a holding relay 25'. The high frequency generator 9 is energized by means of a normally closed switch 26 associated with the temperature switch 23. By virtue of the electromagnetic field produced by the loop 7, the metal component 5 and the aluminum foil or layer 6 are heated. At a specific temperature determined by the setting of the knob 23' of the temperature switch 23, for example, 350°C, a switching pulse is produced which opens the switch 26 but closes the switching contacts $r_1$, $r_2$, and $r_3$. The switching contact $r_1$ switches on the ultrasonic generator 16. As a result of closing the switching contact $r_2$, the servo motor 19 is operated so that the sonotrode is lowered in the direction of arrow 18. The operative surface 12 of the sonotrode insert 11 then comes into contact with the metal component 5. The bearing 13 may be biased by a spring (not shown) which serves to convey the pressure force of the sonotrode and which may be adjusted with respect to that force. In the lowermost position, where there is contact between the sonotrode insert and the metal component 5, a limit switch 27 is operated which turns off the servo motor 19. When the switching contact $r_3$ closes, a timer 28 is switched on and subsequently opens a switch 30 after the expiration of a period of time which is determined by the setting of the knob 29. At this time, the ultrasonic generator 16 is disconnected. From the time the switching contact $r_1$ closes until the opening of the switch 30, the sonotrode is operated from the ultrasonic generator 16 and the ultrasonic transmitter 14. During this time, the welding of the workpiece is being carried out. After the expiration of the welding time or the operative period of the sonotrode as set on the timer 28, the servo motor is switched over by means of the double switch 31. With the opening of the switch 27, the switch 27' is closed so that the servo motor 19 now returns the sonotrode into its initial position. Eventually, the bearing 13 comes in contact with an upper limit switch 32 which returns the change-over switch 27 to its original position and also temporarily opens a self-holding contact 32' to open the main switch 25 and thereby stopping the operation of the sequence control unit 24.

A preferred arrangement for the loop 7 is illustrated in FIGS. 2 and 3, on an enlarged scale. The coil or loop 7 has a centrally raised portion 33 which is above the plane of its contact surface 8' in the region of the slot 2. This structure has the advantage that the welded and still warm workpiece may be removed easily from the slot 2 in the direction of the arrow 34.

The removal of the component may be effected by means of a slide 36 which is illustrated in FIGS. 4 and 5. This slide has a tongue 37, the width of which corresponds to the width of the slot 2. The tongue has a projection which serves as a handle 38. Before the commencement of the welding process, the slide 36 is inserted into the groove 2 in such a manner that its squared edge portion 39 comes into contact with the end wall 40 of the slot 2. In this position of the slide, the non-metallic component 3 is correctly received in the operative point 35. When the welding has been completed, the still warm component may be easily removed from the device.

Instead of the motor 19 illustrated in the drawings, and the limit switches and change-over switches 27, 27' and 32, it is also possible to use other elements such as pneumatically or hydraulically operating elements which are known in welding machines. The control of the lifting devices of this kind can then be carried out by means of electrically or mechanically operated valves.

It should be evident that various modifications can be made to the described embodiments without departing from the scope of the present invention.

I claim:

1. An apparatus for ultrasonic welding comprising a sonotrode, an insert at right angles to the direction of oscillation of said sonotrode, a workpiece holder arranged to receive a non-metallic component, generating means for producing a high frequency electromagnetic field surrounding said component, said insert being positioned to provide ultrasonic oscillations parallel to the surface of a component received in said workpiece holder.

2. Apparatus as claimed in claim 1 in which said generating means rests on a base composed of ceramic material.

3. Apparatus as claimed in claim 1 which includes a photoelectrically operating temperature measuring device for monitoring the temperature of the materials being welded.

4. Apparatus as claimed in claim 1 which includes lifting means for positioning said sonotrode relative to the components being welded, and a sequence control means for actuating said lifting means.

5. Apparatus as claimed in claim 1 in which said generating means has a raised central portion overlying said workpiece holder.

6. Apparatus as claimed in claim 5 in which said workpiece holder is in the form of a groove.

* * * * *